(12) United States Patent
Riddell

(10) Patent No.: US 8,567,111 B2
(45) Date of Patent: *Oct. 29, 2013

(54) ELECTRIC DETERRENT DEVICE

(75) Inventor: Cameron A. Riddell, Carson, CA (US)

(73) Assignee: Bird Barrier America, Inc., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/360,361

(22) Filed: Jan. 27, 2009

(65) Prior Publication Data

US 2009/0126651 A1 May 21, 2009

Related U.S. Application Data

(63) Continuation of application No. 10/729,330, filed on Dec. 4, 2003, now Pat. No. 7,481,021.

(51) Int. Cl.
*A01M 29/26* (2011.01)
*A01M 29/24* (2011.01)
*A01M 23/38* (2006.01)
*A01M 29/00* (2011.01)

(52) U.S. Cl.
USPC ....................................... 43/98; 43/1; 256/10

(58) Field of Classification Search
USPC ....... 43/98, 112, 1; 52/101; 256/10; 119/908, 119/712, 713, 531, 532
See application file for complete search history.

(56) References Cited

U.S. PATENT DOCUMENTS

| | | | | |
|---|---|---|---|---|
| 1,956,639 | A * | 5/1934 | Dana et al. | 174/106 SC |
| 1,976,721 | A * | 10/1934 | Gengler | 256/10 |
| 2,647,228 | A * | 7/1953 | Just | 43/1 |
| 2,989,789 | A | 6/1961 | Cohn | |
| 3,294,893 | A * | 12/1966 | Shaffer | 52/101 |
| 3,320,354 | A | 5/1967 | Marley, et al. | |
| 3,366,854 | A * | 1/1968 | Robinson | 43/98 |
| 3,622,685 | A * | 11/1971 | Crowl | 174/44 |

(Continued)

FOREIGN PATENT DOCUMENTS

| | | | | |
|---|---|---|---|---|
| DE | 3930012 A1 * | 3/1991 | | 43/98 |
| DE | 4127774 A1 * | 2/1993 | | |

(Continued)

OTHER PUBLICATIONS

Bird Barrier America, Inc., pp. 16-17 of its 1997 Catalog, published in the United States.

(Continued)

*Primary Examiner* — Darren W Ark

(74) *Attorney, Agent, or Firm* — Dickstein Shapiro LLP

(57) ABSTRACT

A deterrent device for delivering an electric shock to an animal, pest or bird to be deterred, having the typical components of a non-conductive base to which the electrically conductive elements are attached. Instead of the typically-used copper wire, however, the braided elements comprise smaller strands of a conductive material, such as copper, aluminum or stainless steel wire, is used and is mechanically attached to the non-conductive base. The braided elements can be mechanically attached using a simple sewing operation in which the braid is sewn to the base. Because of the mechanical attachment and the ability of the braided elements to flex in both contraction and extension, the device of this invention can be used in tight corners and other contorted locations without having the wires of the typical prior art device pull free of the base.

33 Claims, 4 Drawing Sheets

(56) References Cited

U.S. PATENT DOCUMENTS

| | | | |
|---|---|---|---|
| 3,717,802 A * | 2/1973 | Plevy et al. ................... 256/10 |
| 4,015,176 A | 3/1977 | Shanahan et al. |
| 4,111,400 A | 9/1978 | Enoksson |
| 4,118,752 A * | 10/1978 | Iguchi ............................ 256/10 |
| 4,186,512 A | 2/1980 | Berg |
| 4,274,123 A | 6/1981 | Rogers, Jr. |
| 4,299,048 A * | 11/1981 | Bayes .............................. 43/98 |
| 4,352,007 A * | 9/1982 | Baker et al. .................. 392/472 |
| 4,471,561 A * | 9/1984 | Lapierre ........................ 43/112 |
| 4,475,141 A * | 10/1984 | Antonevich .................. 361/220 |
| 4,494,733 A * | 1/1985 | Olsson ............................ 256/10 |
| 4,533,120 A * | 8/1985 | Ruddock ........................ 256/10 |
| 4,706,941 A * | 11/1987 | Sherdan ......................... 256/10 |
| 4,728,080 A * | 3/1988 | Kurschner et al. ............. 256/10 |
| 4,747,229 A | 5/1988 | Chambers |
| 4,839,984 A * | 6/1989 | Saunders et al. ............... 43/112 |
| 4,861,645 A * | 8/1989 | Standing ...................... 428/196 |
| 4,862,637 A | 9/1989 | Dressel |
| 4,905,969 A * | 3/1990 | Kurschner et al. ............. 256/10 |
| 4,949,216 A | 8/1990 | Djukastein |
| 4,962,619 A | 10/1990 | Chatten |
| 5,007,196 A * | 4/1991 | Saunders et al. ............... 43/112 |
| 5,019,438 A | 5/1991 | Rapisarda |
| 5,031,353 A * | 7/1991 | Gardiner ......................... 43/98 |
| 5,036,166 A * | 7/1991 | Monopoli ...................... 256/10 |
| 5,049,704 A * | 9/1991 | Matouschek ................. 174/261 |
| 5,095,646 A * | 3/1992 | Bunkers .......................... 43/98 |
| 5,096,162 A * | 3/1992 | Cleveland ...................... 256/10 |
| 5,107,620 A * | 4/1992 | Mahan ............................ 43/98 |
| 5,151,319 A * | 9/1992 | Schoutteten .................. 442/313 |
| 5,158,039 A * | 10/1992 | Clark ............................ 119/712 |
| 5,163,658 A * | 11/1992 | Cleveland ...................... 256/10 |
| 5,253,444 A | 10/1993 | Donoho et al. |
| 5,357,049 A * | 10/1994 | Plummer, III .................. 174/36 |
| 5,366,780 A * | 11/1994 | Rapisarda ..................... 428/102 |
| 5,430,255 A | 7/1995 | Downie et al. |
| 5,433,029 A | 7/1995 | Donoho et al. |
| 5,570,537 A * | 11/1996 | Black et al. .................... 43/112 |
| 5,677,674 A * | 10/1997 | Wolf ............................ 340/541 |
| 5,835,332 A * | 11/1998 | White et al. .................. 361/220 |
| 5,850,808 A * | 12/1998 | Burdick ......................... 52/101 |
| 5,957,434 A * | 9/1999 | Nilsson .......................... 256/10 |
| 6,006,698 A * | 12/1999 | Negre .............................. 43/1 |
| 6,145,236 A | 11/2000 | King |
| 6,250,023 B1 | 6/2001 | Donoho |
| 6,283,064 B1 * | 9/2001 | Djukastein et al. ............ 43/112 |
| 6,314,914 B1 | 11/2001 | Betzen |
| 6,332,262 B1 | 12/2001 | Sakamoto |
| 6,341,550 B1 * | 1/2002 | White ................................. 87/5 |
| 6,371,054 B1 * | 4/2002 | Celata et al. ...................... 43/1 |
| 6,457,283 B1 | 10/2002 | Jensen |
| 6,472,602 B1 * | 10/2002 | Pokrandt ........................ 256/10 |
| 6,477,027 B1 * | 11/2002 | McKelvy ..................... 361/220 |
| 6,834,846 B2 * | 12/2004 | Robbins, III ................... 256/10 |
| 6,925,748 B2 * | 8/2005 | McGill et al. ................... 43/98 |
| 6,928,768 B1 * | 8/2005 | Snow ............................... 43/98 |
| 6,933,446 B1 * | 8/2005 | Waldorf et al. ............ 174/117 F |
| 7,020,995 B1 * | 4/2006 | Snow ............................... 43/98 |
| 7,249,436 B2 * | 7/2007 | Ravenelle et al. ............... 43/98 |
| 7,351,913 B2 * | 4/2008 | Waldorf et al. ................. 52/101 |
| 7,434,788 B2 * | 10/2008 | Foster ............................. 43/98 |
| 7,481,021 B2 * | 1/2009 | Riddell ........................... 43/98 |
| 7,802,396 B2 * | 9/2010 | Donoho ........................... 43/98 |
| 7,937,885 B2 * | 5/2011 | Donoho ........................... 43/98 |
| 8,015,747 B2 * | 9/2011 | Donoho ........................... 43/98 |
| 8,020,340 B2 * | 9/2011 | Donoho ........................... 43/98 |
| 8,196,340 B2 * | 6/2012 | Donoho ........................... 43/98 |
| 8,196,341 B2 * | 6/2012 | Donoho ........................... 43/98 |
| 8,286,385 B2 * | 10/2012 | Donoho ........................... 43/98 |
| 8,293,044 B1 * | 10/2012 | Riddell ........................... 43/98 |
| 8,407,932 B2 * | 4/2013 | Donoho ........................... 43/98 |
| 8,424,238 B2 * | 4/2013 | Donoho ........................... 43/98 |
| 8,430,063 B1 * | 4/2013 | Riddell ......................... 119/712 |
| 2001/0015426 A1 * | 8/2001 | Bellon ........................... 256/10 |
| 2001/0048053 A1 | 12/2001 | Donoho |
| 2002/0066895 A1 * | 6/2002 | Wildschut ...................... 256/10 |
| 2002/0092481 A1 * | 7/2002 | Spooner ....................... 119/908 |
| 2003/0172575 A1 | 9/2003 | Donoho |
| 2003/0208967 A1 | 11/2003 | Riddell |
| 2004/0173786 A1 | 9/2004 | Robbins, III |
| 2004/0255837 A1 | 12/2004 | Donoho |
| 2005/0132635 A1 * | 6/2005 | Riddell ........................... 43/98 |
| 2005/0150469 A1 * | 7/2005 | Wolfgram .................... 119/712 |
| 2006/0032111 A1 * | 2/2006 | Willard et al. ................... 43/98 |
| 2007/0220802 A1 * | 9/2007 | Donoho ........................... 43/98 |
| 2008/0028668 A1 * | 2/2008 | Pollman ......................... 43/112 |
| 2010/0180490 A1 * | 7/2010 | Donoho ........................... 43/98 |
| 2011/0067646 A1 * | 3/2011 | Donoho ........................... 43/98 |
| 2011/0146589 A1 * | 6/2011 | Donoho ......................... 119/713 |
| 2011/0214339 A1 * | 9/2011 | Donoho ........................... 43/98 |
| 2011/0314724 A1 * | 12/2011 | Donoho ........................... 43/98 |
| 2013/0008078 A1 * | 1/2013 | Turner ............................ 43/98 |
| 2013/0061515 A1 * | 3/2013 | Donoho ........................... 43/98 |
| 2013/0081578 A1 * | 4/2013 | Donoho ........................ 119/712 |
| 2013/0097916 A1 * | 4/2013 | Turner ............................ 43/98 |
| 2013/0160350 A1 * | 6/2013 | Donoho ........................... 43/98 |

FOREIGN PATENT DOCUMENTS

| | | | |
|---|---|---|---|
| DE | 19544117 A1 * | 5/1997 |
| DE | 199544117 A1 | 5/1997 |
| EP | 0592054 A1 | 4/1994 |
| EP | 1205589 | 5/2002 |
| EP | 1205589 A1 * | 5/2002 |
| EP | 1314355 A2 * | 5/2003 |
| GB | 1207496 | 9/1968 |
| JP | 08256666 A * | 10/1996 |
| JP | 11155463 A * | 6/1999 |
| JP | 11289959 A * | 10/1999 |
| JP | 11346634 A | 12/1999 |
| JP | 11346634 A * | 12/1999 |
| JP | 200032901 A | 2/2000 |
| JP | 2000032901 A * | 2/2000 |
| JP | 200200163 | 1/2002 |
| JP | 2002000163 A * | 1/2002 |
| JP | 2002017235 A * | 1/2002 |
| JP | 2002119193 A * | 4/2002 |
| JP | 2003219788 | 8/2003 |
| JP | 2006340691 A * | 12/2006 |
| JP | 2007000142 A * | 1/2007 |
| WO | WO 84/04022 * | 4/1984 ....................... 43/98 |
| WO | WO 84/04022 | 11/1984 |
| WO | WO-9320689 | 10/1993 |
| WO | WO 9320689 A1 * | 10/1993 |
| WO | WO 95/08915 | 4/1995 |
| WO | WO 96/08140 | 3/1996 |
| WO | WO-2004021780 A1 | 3/2004 |
| WO | WO 2004021780 A1 * | 3/2004 |

OTHER PUBLICATIONS

Bird Barrier America, Inc., pp. 24-25 of its 2001 Catalog, published in the United States.

Bird Barrier America, Inc., undated one-page Flyer for its "Bird Shock V2" device published in the United States.

* cited by examiner

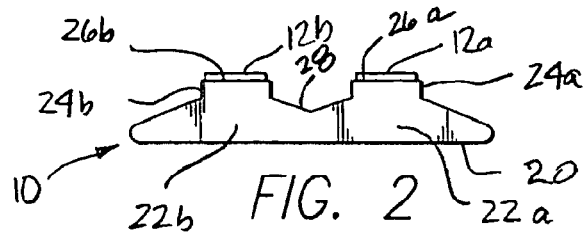
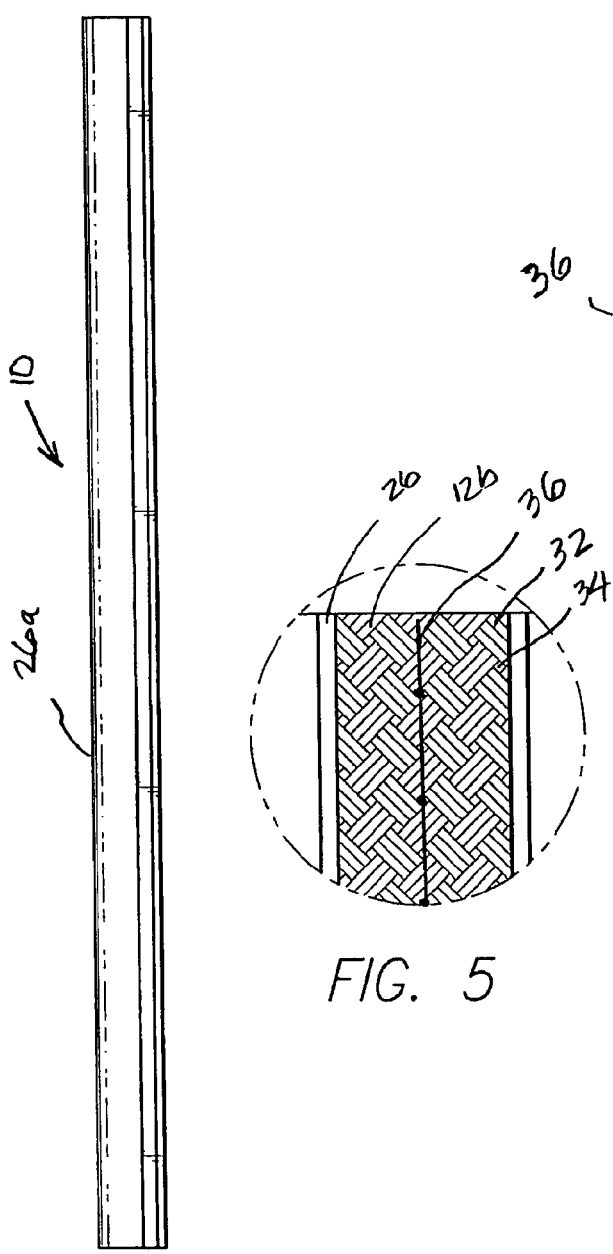
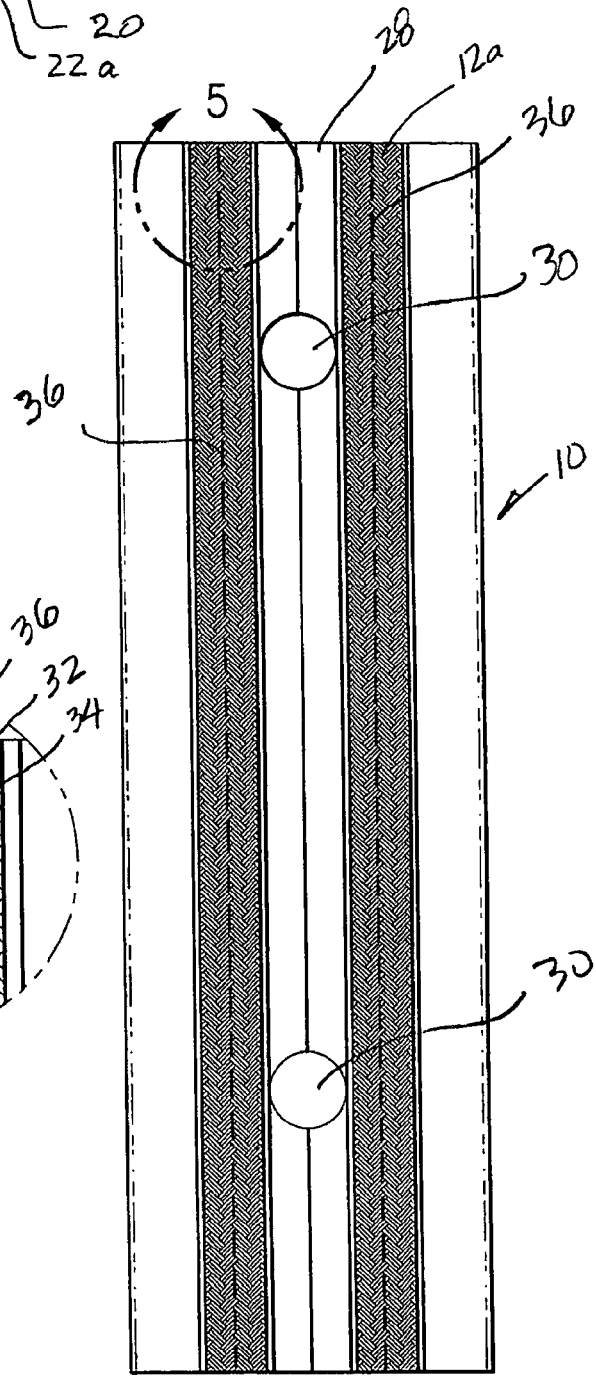

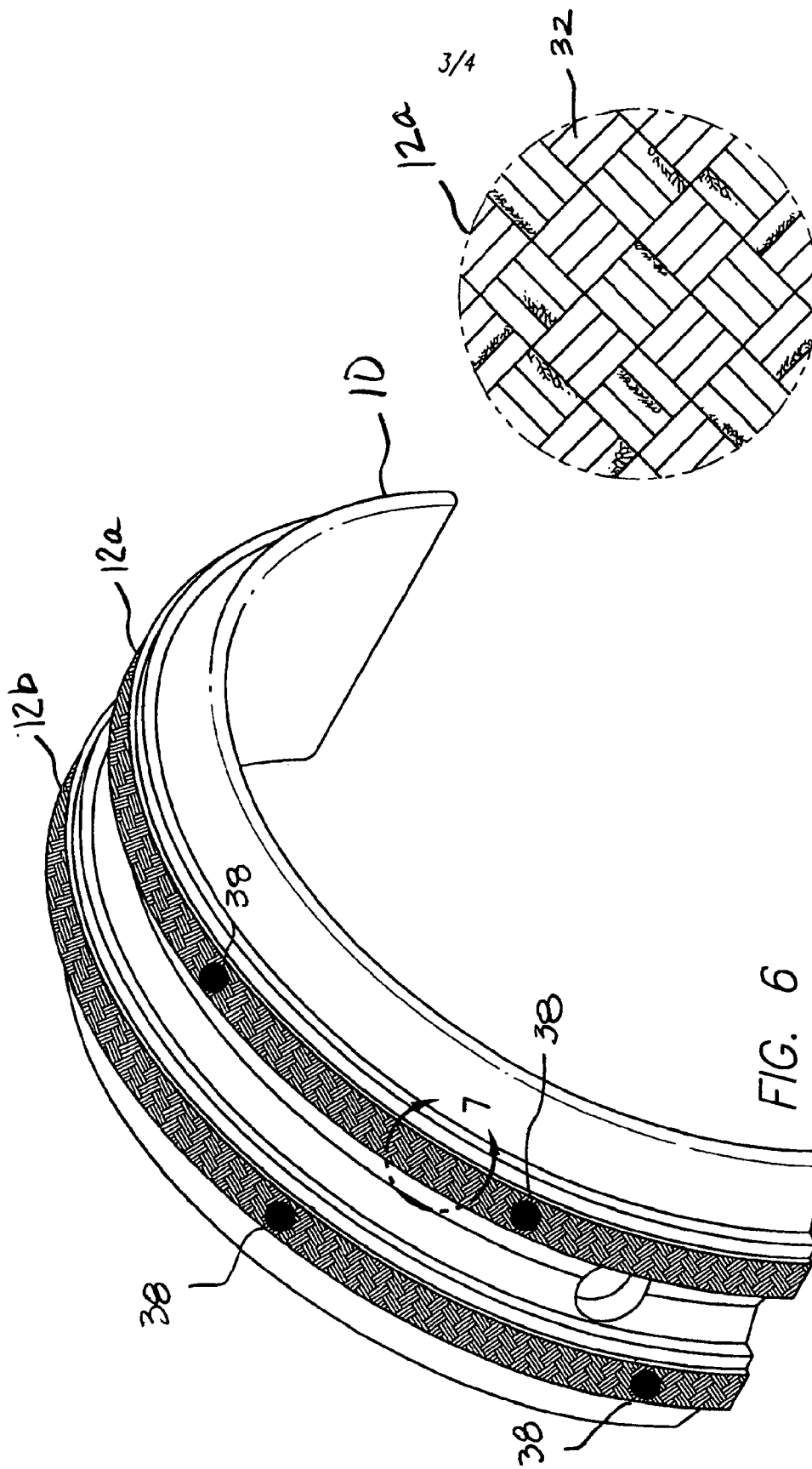

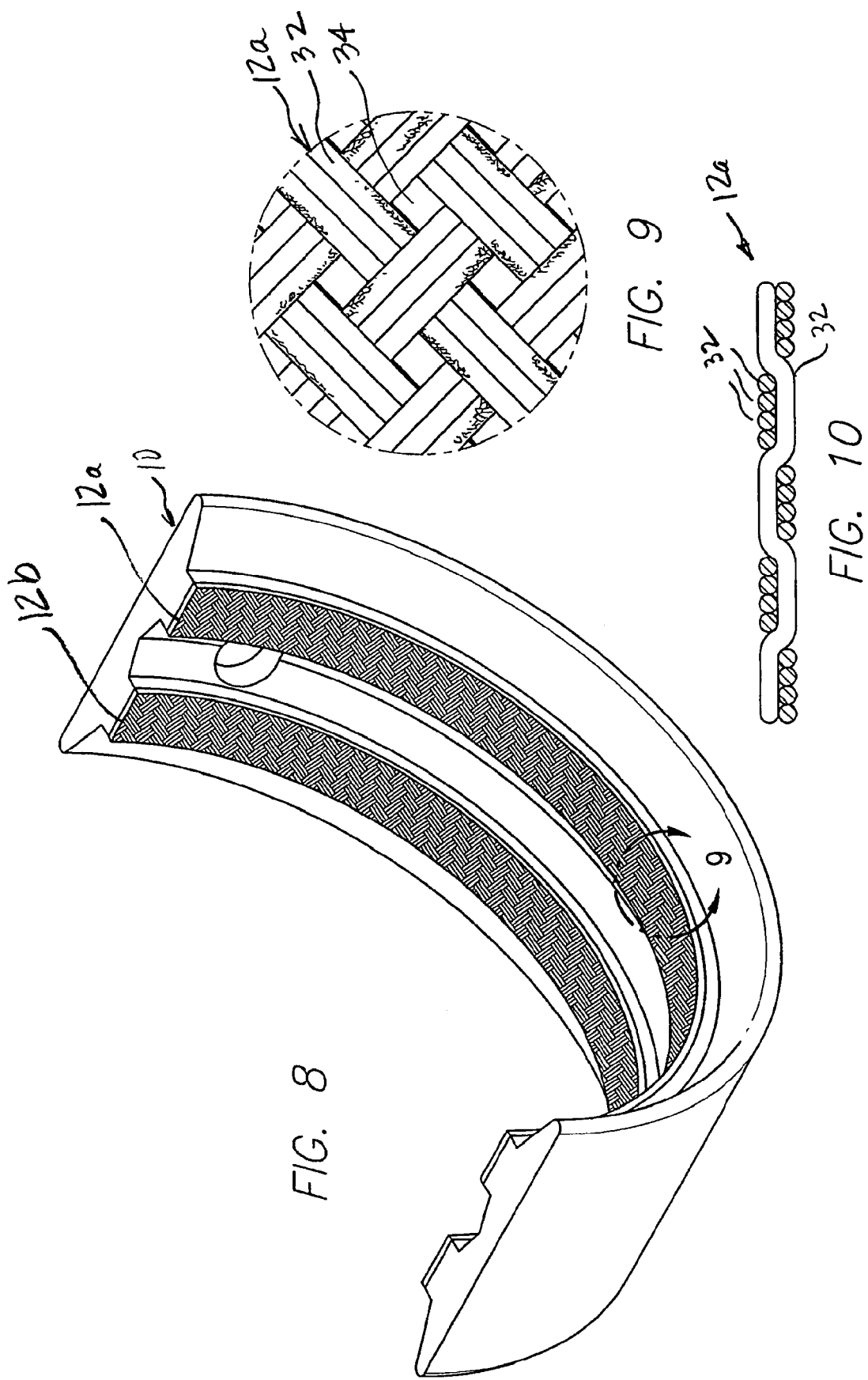

ELECTRIC DETERRENT DEVICE

CROSS-REFERENCE TO RELATED APPLICATION

This application is a continuation of patent application Ser. No. 10/729,330, filed Dec. 4, 2003, now U.S. Pat. No. 7,481,021, which is fully incorporated herein by reference in its entirety.

BACKGROUND OF THE INVENTION

This invention relates generally to a device in which an electrical shock is delivered to the animal that comes into contact with it. Such devices find primary utility as pest deterrent devices. In particular, this invention pertains to such a device that is particularly well adapted for use as a bird deterrent device, but could be utilized with other animals as well.

Ever since electricity was first put to commercial and residential use in the United States in the late 1800's to solve the age-old problem of darkness, the ability of electrical current to deliver an electric shock to a person or animal has been recognized, and electricity utilized as a result for things other than powering lights and motors. Non-lethal applications of electricity for use in encouraging animals to do something or not do something soon followed the use of electricity for lights and motors. The electric cattle prod is perhaps the best known of those devices. Today, however, electricity is used in many ways with animals, such as electric fences to keep farm animals in and predators out, and even dog trainers sometime use an electrical stimulus in a dog collar to assist in their training.

Another age-old problem that has been perplexing mankind since long before the discovery and harnessing of electricity is the propensity of pests in general, but particularly birds, to land in areas where their human neighbors would prefer they didn't. Since the very first bird deterrent device used by man—undoubtedly a thrown rock—an incredible array of devices have been used to dissuade birds from landing or roosting in areas desired by the birds but undesirable to humans. Metallic spike-like, coil or rotating devices, sound-emitting devices, imitation predators, and even real predators, are just a few examples of bird deterrent devices that have been used. Therefore, it is not at all surprising that devices using lethal and non-lethal electrical shock would also be employed along the way.

A typical device of this type is shown in U.S. Pat. No. 4,299,048, in one embodiment of which a pair of copper wires connected to a power source are embedded in opposites sides of a cable of appropriate diameter such that when the birds of choice (in this case, starlings) land on the cable, their feet touch both wires, closing the circuit and thereby delivering a lethal shock to the birds.

The much more recently-issued U.S. Pat. No. 6,283,064 discloses another version of a bird and pest deterrent device in which a pair of crimped copper wires are appropriately spaced apart so that the bird's or other pest's feet will touch both wires, resulting in a short circuit and delivering a shock to the bird or other pest.

Other devices for carrying electric charges for discouraging birds and other pests are described in U.S. Pat. Nos. 3,294,893; 3,336,854; 3,717,802; 4,299,048; and 5,850,808, for example. Each of these necessarily include the broad concept of appropriately spaced-apart wires which will both be contacted by the bird (or other pest's) feet (or other part of their anatomy) so as to deliver the appropriate electric shock.

While all of these devices work, at least initially, to an acceptable degree in some installations, the problem that prior art devices of this type have long encountered has been in providing such a device that can be used in something other than relatively straight-line, flat applications and that have a sufficiently long expected useful life in that application. These problems arise from the fact that these devices inherently need two things—1) the conductive elements, typically metal wires, that carry the electrical current; and 2) a non-conductive base element, to which the wires are attached. Most typically, the metal wires are held by friction and/or glue within an appropriately sized channel in the base. See, for example, the devices disclosed in U.S. Pat. Nos. 5,850,808; 4,299,048 and 3,366,854. Because the metal wires and the non-metallic bases have different coefficients of expansion and contraction, and different degrees of flexibility, however, there is a tendency for the wires in these devices to become detached from the base over time since these devices are typically used in locations that are directly exposed to the weather. This problem is exacerbated if the location to which the device is applied is other than a straight, flat surface, as any twisting or bending of the device places unequal stresses on the base and the wires causing them to become loose or even pop out of their holding channels.

These two problems have been addressed in different ways, and continue to cause problems in the industry, as those skilled in the art continue to seek to find ways to solve the problems. For one recent example, in U.S. Pat. No. 6,283,064, the base "has spaced notches along each edge to provide flexibility to the base, whereby the base may be bent both out of the plane and within the plane" (id., Col. 1, lines 64-66) and the "wires are crimped in undulating fashion along their length, to provide them with give so that they will not disassociate from the base when it is bent or when the wires and base expand and contract at different rates." (Id., Col. 2, lines 7-11).

While the prior art devices are useful to a degree, they still suffer from certain drawbacks, including limitations on the degree to which they can be bent without inducing potentially disabling stresses, and relatively higher cost. Therefore, there exists a need in the art for an improved electrical shock deterrent device that solves these problems, and does so in an efficient, reliable, low cost way.

SUMMARY OF THE INVENTION

This invention provides such an improved device by replacing the typically-used wire with a braided element than can be sewn to the base, entirely eliminating the need for an appropriately-sized channel into which the metallic wire is inserted. The braided element can be composed of individual strands of any sufficiently conductive material, such as metal wire. The strands could also include some conductive and some non-conductive strands. The individual strands can be of any appropriate cross-sectional design, such as round, square, oblong or flat. The base can be of any non-conductive material, and is preferably PVC or other elastomeric material that is, in addition to being an insulator, UV resistant and extremely flexible. The size and spacing of the braided element and the size and configuration of the base can be designed for whatever animal, pest or bird is to be deterred.

Because the braided element is not a single, solid piece of metal, but comprised of individual strands woven together to form the braided element, such that each strand can move relative to one another, the braided element can be easily sewn directly onto the base, creating a very strong mechanical bond. If an embodiment is used in which the braided element is substantially flat, it can also be glued to the base, although sewing has proven sufficient and preferable. Other attachment means could also be employed.

Because the preferred base is constructed of a very flexible material, because of the very secure mechanical attachment between the braided elements and the base accomplished by sewing, and because the braided element is extremely flexible, the base and braided element combination of this invention can literally be bent into a 180-degree angle, inwardly or outwardly, within a curvature radius of less than one inch without experiencing any detachment. In the area of curvature, the braided element simply expands or contracts in width (depending on which way the device is bent) as the added stresses are distributed over all of the individual strands in the braided element, rather than having to be handled by one, single, large wire. Also, because the individual strands are braided, there is significant leeway for them to flex so as to accommodate the severe bending action.

DESCRIPTION OF THE FIGURES

FIG. 2 is an end view of the preferred embodiment of this invention, showing the braided element in the preferred position on the elevated pedestal portion of the base.

FIG. 3 is a side view of the preferred base of this invention, showing that it is preferably constructed off a single extruded piece of material in the desired length.

FIG. 4 is a top view of the preferred embodiment of this invention. The dotted line extending down the middle of each of the braided element represents the stitching of the sewn attachment means. The spaced-apart holes in the center of the base that can be used for attaching the base to the desired surface area are also shown.

FIG. 5 is an isolated, enlarged view taken from circle-5 in FIG. 4. It shows in greater detail the braided nature of the conductive element and the preferred sewing attachment means. As also depicted here, in the preferred embodiment, the individual strands of the braided element are not braided tightly together at rest, but have some free space. Although the individual strands of the braided element shown here and in the other Figures are depicted as being in a fairly linear cross-hatched arrangement, in one of the preferred embodiments the strands are in a much more curvilinear configuration forming the braided element.

FIG. 6 shows the preferred embodiment (absent the sewn stitching) in which the top side of the device is being bent in a concave fashion. Although this Figures shows a very significant curvature, the device of this invention is actually capable of being bent much more severely without adversely affecting the attachment between the conductive braided elements and the non-conductive base.

FIG. 7 is an isolated, enlarged view taken from circle-7 in FIG. 6, and shows that in concave flex, the elongation stress placed on the braided element is absorbed by the individual strands within the braided element pulling tightly together.

FIG. 8 shows the preferred embodiment (absent the sewn stitching) in which the top side of the device is being bent in a convex fashion. Although this Figures shows a very significant curvature, the device of this invention is actually capable of being bent much more severely without adversely affecting the attachment between the conductive braided elements and the non-conductive base.

FIG. 9 is an isolated, enlarge view taken from circle-7 in FIG. 9, and shows that in convex flex, the compression stress placed on the braided elements is absorbed by the individual strands expanding apart from one another, and the overall width of the braided element becoming larger.

FIG. 10 is an end view of one embodiment of the braided element.

DESCRIPTION OF THE PREFERRED EMBODIMENTS

Figure 1:
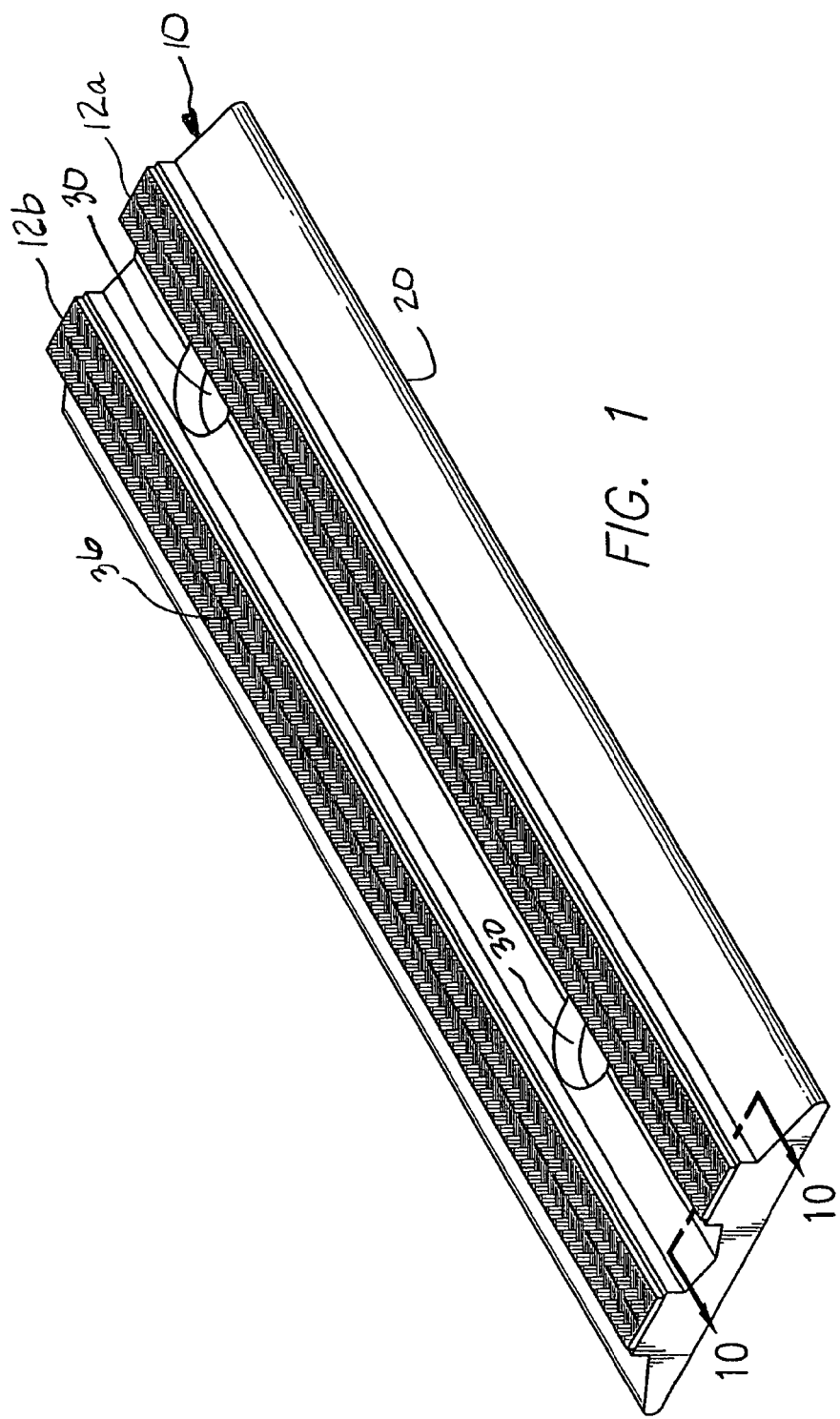
FIG. 1 is a perspective view of the preferred embodiment of this invention.

Looking at FIG. 1, it is seen that the preferred embodiment of this invention is of essentially three-piece construction, having a base 10 and a pair of braided elements 12a and 12b attached thereto.

The base 10 has a flat lower surface 20 that is presented for attachment to the surface of the location from which the pests or birds are to be deterred. In this embodiment, as best seen in FIG. 2, the cross-sectional shape of the base 10 is essentially co-joined pedestals 22a and 22b that each present an elevated section 24a and 24b, respectively, and each having and upper flat surface 26a and 26b to which the braided elements 12a and 12b are attached. A central gap 28 exists between the two elevated section 24a and 24b, and is useful to provide for water run-off to prevent accidental short circuiting of the device in the presence of water which may accumulate due to rain or irrigation.

In this embodiment, the base 10 is approximately 1.5 inches wide, and approximately 0.25 inches high (from the lower surface 20 to the upper surfaces 26a and 26b. The height of the elevated sections 24a and 24b is approximately 0.06 inches. The width of each of the upper surfaces 26a and 26b is approximately 0.25 inches, and the distance between the longitudinal centerlines of the upper surfaces 26a and 26b is approximately 0.625 inches, leaving a gap area 28 between them of approximately 0.375 inches. These dimensions are, of course, by way of illustration only. The dimensions can be varied in any fashion as appropriate to the application. Also, the length of the device segment shown is relatively short. The base 10 can be constructed of any length, and is preferably constructed in as long a length as feasible so as to avoid inter-connecting segments of the device. Because the device of this invention can be curved without harming its performance or life-expectancy, it can be rolled for shipment and storage, thus allowing for much longer single-formed pieces than with other prior art devices.

As best seen in FIGS. 1 and 4, holes 30 are placed through the base 10 in the gap area 28 at regular intervals along the entire length of the base to facilitate attachment of the device to the perch location (not shown), for example. Plainly, the holes 30 are only one of innumerable ways in which the attachment can be facilitated. Attachment can be my mechanical means such as screw, bolts, staples or nails, or any other attachment means such as adhesives, or a combination of them.

The base 10 can of course be of any shape and size as dictated by the specific size and type of animal, bird or pest to be deterred, and the area to which the device is to be installed, so long as the two braided elements are kept a sufficient distance apart so as to prevent short circuiting, and are not so far apart at to not be short-circuited when the intended-to-be-deterred animal, pest or bird contacts the device.

The base 10 can also be constructed of any material so long as there is sufficient non-conductive material immediately adjacent the braided elements 12a and 12b so as to prevent short circuiting. In the preferred embodiment, the entire base 10 is of a single material, in this case extruded polyvinyl chloride ("PVC"), that is extremely flexible, durable and UV resistant, and is sufficiently soft so as to allow for the sewing operation whereby the braided elements 12a and 12b can be sewn directly to the base. The base 10 can also be constructed of any color so as to blend with the structure to which it will ultimately be attached. As noted, it is not necessary that the base be of unitary material and construction. The PVC used in the base can be either cellular, flex or rigid. Other possible material for construction of the base include but are not limited to neoprene, fluoroelastomer (available commercially under trademarks Vitron® and Flourel®), silicone, natural rubber, buna N (nitrile), buna S (SBR), thermoplastic rubber, synthetic polyisoprene, EPDM and polyurethane.

The braided elements 12a and 12b comprise individual strands 32 which can be of any suitable conductive material. In some embodiments, the individual strands 32 could include some conductive strands and some not (for example, if a few strands of a very strong, albeit non-conductive material might be desired to add even more strength and durability). While flat braids are preferred, non-flat braided material could also be used. Also, while stainless steel is preferred, copper or zinc plated copper are just two examples of many other conductive materials that could be substituted. A suitable commercially available braid is that provided by Hamilton Products, Sherburne N.Y. (www.hamprods.com). The size of the braid, the number of strands, the size of the individual strands and other specifications for the braided elements are matters of choice depending on the application for the device. However, a ⅜ inch wide braid having 48 strands, and capable of handling up to 40 nominal amperes of current has proven effective for a wide range of applications. Also, although the preferred braided elements 12a and 12b have a substantially flat cross-section configuration, braided elements having a substantially oblong, round, rectilinear or even triangular (or any other shape) cross-sectional configuration could also be used.

The preferred means for attaching the braided elements 12a and 12b to the base 10 is by sewing. Because the braided elements 12a and 12b are composed of multiple strands 32 somewhat loosely woven together rather than the single copper wire used in most prior art devices, there is sufficient free space 34 between the adjacent strands 32 such that the sewing operation never has to pierce, and preferably does not pierce, any of the strands 34. Rather, the sewing operation creates a secure mechanical lock as the thread used to sew bridges across the individual strands. While any suitably durable and strong thread can be used in the sewing operation, 100% polyester Star Ultra® Monocord from Coats, North American (www.coatscna.com) has proven suitable. A single line of stitching 36 down the longitudinal center of each braided element 12a and 12b has proven sufficient, although many other sewing stitches, styles and placement would work as well.

Of course, other attachment means for attaching the braided elements 12a and 12b to the base 10 could be used instead of or in addition to sewing. For example, the braided elements 12a and 12b could also be glued or heat-melted to the base, or stapled, or bolted, or screwed into place on the base. However, it is believed that for ease of construction, for durability, and for attractiveness, sewing is preferred.

The ends of braided elements 12a and 12b are attached to the terminals of a conventional power source (not shown). A charge of approximately 800 volts alternating current, at low ampere (10 mA) or 7.5 KV, 3 amp direct current, has proven effective to deter birds. Larger voltages and amperes may be necessary for larger animals. Of course, if the desire was to execute the pest rather than simply deter, then the voltages and amperes would have to be increased accordingly, and the current bearing characteristics of the braided elements 12a and 12b would have to be adjusted accordingly as well.

The device of this invention can be attached to a just about any surface where deterrence is desired—from flat horizontal surfaces (such as window ledges, building edges and billboard tops where some birds like to perch and roost), to vertical or skewed surfaces (such as fence rails, posts or other surfaces where the device might be used to deter farm animals, vermin or varmints), to radically curved surfaces (such as on outdoor artwork and statues to deter birds from perching and defacing the structure with their droppings). The device can also easily accommodate planar and non-planar angles. Because the device can be radically bent in a non-planar way, most non-planar surface transitions can be accommodated simply by bending the device. For planar surface transitions, the base 10 and braided elements 12a and 12b can be easily cut through at any angle using conventional means so that adjacent ends of the cut pieces can be brought together to follow the application topography. The adjacent cut ends of the braided elements 12a and 12b can be reattached to recreate the circuit by any conventional means such as flexible, crimpable connector pieces or soldering, as only two of many examples.

Although preferred embodiments have been shown and described, the disclosed invention and the protection afforded by this patent are not limited thereto, but are of the full scope of the following claims, and equivalents thereto.

The invention claimed is:

1. An electric deterrent device comprising:
  a flexible elongated non-conductive base strip;
  at least a pair of elongated flexible electrically conductive elements attached to said flexible elongated non-conductive base strip along a length of the base strip wherein, each elongated flexible electrically conductive element of the at least a pair of elongated flexible electrically conductive elements has a plurality of free spaces along a length of the elongated flexible electrically conductive element and wherein, the free spaces form openings through the elongated flexible electrically conductive element wherein, the openings pass from a top of the electrically conductive element toward the base strip; and
  said at least a pair of elongated flexible electrically conductive elements are attached to said flexible elongated non-conductive base strip by sewing through at least some of the free spaces.

2. The electric deterrent device of claim 1, wherein a first element of said at least a pair of flexible electrically conductive elements does not plastically deform when bent within a curvature radius of less than one inch.

3. The electric deterrent device of claim 1, wherein a first element of said at least a pair of flexible electrically conductive elements does not detach from the base when bent within a curvature radius of less than one inch.

4. An electric deterrent device comprising:
  a flexible elongate non-conductive base;
  at least a pair of flexible electricity conducting elements attached to said non-conductive base, each element of said at least a pair of flexible electricity conducting elements comprising two electrically conductive flexible strands intermittently in contact with each other along a length of each said element of said at least a pair of flexible electricity conducting elements;
  said at least a pair of electricity conducting elements attached to said flexible elongate base by sewing.

5. The electric deterrent device of claim 4, wherein the two electrically conductive flexible strands are in repetitive intermittent contact with each other along a length of each said element of said at least a pair of flexible electricity conducting elements.

6. The electric deterrent device of claim 4, wherein the two electrically conductive flexible strands are in contact along a length of each said element of said at least a pair of flexible electricity conducting elements such that free spaces in between said two electrically conductive flexible strands are formed along the length of each said electrically conductive element of said at least a pair of flexible electricity conducting elements.

7. The electric deterrent device of claim 6, wherein said at least a pair of electricity conducting elements are attached to said flexible elongate base by sewing through at least some of the free spaces.

8. An electric deterrent device comprising:
a flexible elongate non-conductive base;
at least a pair of flexible electricity conducting elements attached to said non-conductive base, each element of said at least a pair of flexible electricity conducting elements comprising at least a pair of electrically conductive flexible strands intermittently in contact with each other along a length of each said element of said at least a pair of flexible electricity conducting elements;
said at least a pair of electricity conducting elements attached to said flexible elongate base by sewing.

9. The electric deterrent device of claim 8, wherein the at least a pair of electrically conductive flexible strands are in repetitive intermittent contact with each other along a length of each said element of said at least a pair of flexible electricity conducting elements.

10. The electric deterrent device of claim 8, wherein the at least a pair of electrically conductive flexible strands are in contact along a length of each said element of said at least a pair of flexible electricity conducting elements such that free spaces in between said at least a pair of electrically conductive flexible strands are formed along the length of each said electrically conductive element of said at least a pair of flexible electricity conducting elements.

11. The electric deterrent device of claim 10, wherein said at least a pair of electricity conducting elements are attached to said flexible elongate base by sewing through at least some of the free spaces.

12. In an electrical animal, pest or bird deterrent device comprising a base that is attachable to a surface from which the animal, pest or bird is to be deterred, and at least a pair of electrically conductive elements attached to the base and attachable to a power source, the improvement comprising each of said conductive elements comprising a plurality of electrically conductive individual strands woven together in a braid-like fashion, and said conductive elements being sewn to said base.

13. The invention of claim 12 wherein said elements which are sewn to said base are attached to said base by sewing using a single stitch down approximately a center of each of said conductive elements.

14. The invention of claim 12 wherein said conductive elements also comprise other strands which are made of a non-conductive material.

15. The invention of claim 12 in which said strands are made of metal.

16. The invention of claim 15 in which said strands are constructed of stainless steel, copper, or zinc plated copper, or a combination thereof 17. The invention of claim 12 in which said base is constructed entirely of a non-conductive material.

18. The invention of claim 12 in which said base is constructed entirely of a material selected from the group of neoprene, fluoroelastomer, silicone, natural rubber, buna n (nitrile), buna s (SBR), thermoplastic rubber, synthetic polyisoprene, EPDM and polyurethane.

19. The invention of claim 12 in which said strands are substantially circular in cross section.

20. An electric deterrent device comprising:
a) a flexible elongate base having at least two areas which are of a non-conductive material;
b) said base being attachable to a surface;
c) at least a pair of flexible electricity conducting elements attached to said areas of non-conductive material of said base, each element of said at least a pair of flexible electricity conducting elements comprising a plurality of electrically conductive strands interwoven together to form each said element of said at least a pair of flexible electricity conducting elements;
d) said at least a pair of electricity conducting elements attached to said flexible elongate base by sewing; and
e) said elements of said at least a pair of flexible electricity conducting elements being attachable respectively to positive and negative terminals of a power source.

21. The invention of claim 20 wherein said strands of said elements are substantially round.

22. The invention of claim 20 wherein said at least a pair of electricity conducting elements attached to said base by sewing which comprises a single linear stitch being used for each element of said at least a pair of electricity conducting elements.

23. The invention of claim 20 wherein said elements of said at least a pair of flexible electricity conducting elements have a substantially flat cross sectional configuration.

24. The invention of claim 20 wherein said plurality of electrically conductive strands are stainless steel.

25. The invention of claim 20 wherein said plurality of electrically conductive strands are copper.

26. The invention of claim 20 wherein said plurality of electrically conductive strands are zinc coated copper.

27. The invention of claim 20 wherein said base is constructed of an elastomeric material.

28. The invention of claim 20 wherein said elements of said at least a pair of flexible electricity conducting elements also comprise other strands of a non-conductive material.

29. An electric deterrent device comprising:
a flexible elongate non-conductive base;
at least a pair of flexible electricity conducting elements attached to said non-conductive base, each element of said at least a pair of flexible electricity conducting elements comprising at least two electrically conductive flexible strands that form each said element of said at least a pair of flexible electricity conducting elements;
wherein the at least a pair of flexible electricity conducting elements are formed from the at least two electrically conductive flexible strands such that free spaces in between said strands are formed intermittently along a length of each said electrically conductive element of said at least a pair of flexible electricity conducting elements;
said at least a pair of electricity conducting elements attached to said flexible elongate base by sewing through at least some of the free spaces; and
said elements of said at least a pair of flexible electricity conducting elements being attachable respectively to positive and negative terminals of a power source.

30. The electric deterrent device of claim 29, wherein a first element of said at least a pair of flexible electricity conducting elements does not plastically deform when bent within a curvature radius of less than one inch.

31. The electric deterrent device of claim 29, wherein a first element of said at least a pair of flexible electricity conducting elements does not detach from the base when bent within a curvature radius of less than one inch.

32. The electric deterrent device of claim 29, wherein the electrically conductive flexible strands are interwoven to form one of said at least a pair of flexible electricity conducting elements.

33. The electric deterrent device of claim 32, wherein the at least two electrically conductive flexible strands that form each said element are interwoven together to form the one of said at least a pair of flexible electricity conducting elements.

* * * * *